United States Patent
Sasabayashi et al.

(10) Patent No.: US 9,607,763 B2
(45) Date of Patent: Mar. 28, 2017

(54) MONOLITHIC CERAMIC ELECTRONIC COMPONENT

(71) Applicant: Murata Manufacturing Co., Ltd., Nagaokakyo-shi, Kyoto-fu (JP)

(72) Inventors: Takehisa Sasabayashi, Nagaokakyo (JP); Akihiro Motoki, Nagaokakyo (JP); Makoto Ogawa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 334 days.

(21) Appl. No.: 14/160,947

(22) Filed: Jan. 22, 2014

(65) Prior Publication Data
US 2014/0211369 A1      Jul. 31, 2014

(30) Foreign Application Priority Data
Jan. 29, 2013    (JP) .................... 2013-013810

(51) Int. Cl.
| | |
|---|---|
| *H01G 4/008* | (2006.01) |
| *H01G 4/30* | (2006.01) |
| *H01G 4/12* | (2006.01) |
| *H01G 4/232* | (2006.01) |

(52) U.S. Cl.
CPC .......... *H01G 4/008* (2013.01); *H01G 4/0085* (2013.01); *H01G 4/30* (2013.01); *H01G 4/12* (2013.01); *H01G 4/232* (2013.01)

(58) Field of Classification Search
USPC .............. 361/305, 306.1, 306.3, 311, 301.4
See application file for complete search history.

(56) References Cited

U.S. PATENT DOCUMENTS

| | | | |
|---|---|---|---|
| 6,829,137 B2 * | 12/2004 | Konaka | B82Y 30/00 361/321.4 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |

(Continued)

FOREIGN PATENT DOCUMENTS

| | | |
|---|---|---|
| JP | 63-169014 A | 7/1988 |
| JP | 2011-23707 A | 2/2011 |

(Continued)

OTHER PUBLICATIONS

Official Communication issued in corresponding Korean Patent Application No. 10-2014-0010469, mailed on Jul. 6, 2015.

(Continued)

*Primary Examiner* — Eric Thomas
(74) *Attorney, Agent, or Firm* — Keating & Bennett, LLP (57) ABSTRACT

A monolithic ceramic electronic component includes a component body and outer electrodes. The component body includes a plurality of stacked ceramic layers and a plurality of inner electrodes which extend between the ceramic layers, which contain Ni, and which include exposed ends exposed on predetermined surfaces of the component body. The outer electrodes are electrically connected to the exposed ends of the inner electrodes and are formed on the predetermined surfaces of the component body by plating. The inner electrodes include Mg—Ni coexistence regions where Mg and Ni coexist.

18 Claims, 4 Drawing Sheets

(56) References Cited

U.S. PATENT DOCUMENTS

| | | | |
|---|---|---|---|
| 7,154,374 | B2 | 12/2006 | Ritter et al. |
| 7,161,794 | B2 | 1/2007 | Galvagni et al. |
| 7,177,137 | B2 | 2/2007 | Ritter et al. |
| 7,344,981 | B2 | 3/2008 | Ritter et al. |
| 7,345,868 | B2 | 3/2008 | Trinh |
| 7,463,474 | B2 | 12/2008 | Ritter et al. |
| 2005/0046536 | A1 | 3/2005 | Ritter et al. |
| 2007/0014075 | A1 | 1/2007 | Ritter et al. |
| 2008/0123248 | A1 | 5/2008 | Kunishi et al. |
| 2008/0123249 | A1 | 5/2008 | Kunishi et al. |
| 2008/0158774 | A1 | 7/2008 | Trinh |
| 2011/0157768 | A1* | 6/2011 | Hur ................. H01G 4/005 361/321.2 |

FOREIGN PATENT DOCUMENTS

| | | |
|---|---|---|
| JP | 2011-139028 A | 7/2011 |
| KR | 10-2010-0136917 A | 12/2010 |

OTHER PUBLICATIONS

Motoki et al.; "Multilayer Electronic Component Including a Counter Diffusion Layer"; U.S. Appl. No. 12/110,484, filed Apr. 28, 2008.

Motoki et al.; "Multilayer Ceramic Electronic Component and Method for Manufacturing the Same"; U.S. Appl. No. 12/356,648, filed Jan. 21, 2009.

Iwanaga et al.; "Monolithic Ceramic Electronic Component and Method for Manufacturing the Same"; U.S. Appl. No. 12/405,370, filed Mar. 17, 2009.

Iwanaga et al.; "Multilayer Ceramic Electronic Component and Method for Producing Same"; U.S. Appl. No. 12/405,372, filed Mar. 17, 2009.

Kayatani et al.; "Multilayer Ceramic Electronic Component and Method for Making the Same"; U.S. Appl. No. 12/469,799, filed May 21, 2009.

Takeuchi et al.; "Multilayer Ceramic Electronic Component and Manufacturing Method Thereof"; U.S. Appl. No. 12/340,570, filed Dec. 19, 2008.

Kobayashi et al.; "Multilayer Ceramic Electronic Component and Method for Making the Same"; U.S. Appl. No. 12/490,471, filed Jun. 24, 2009.

Nishihara et al.; "Laminated Ceramic Electronic Component and Manufacturing Method Thereof"; U.S. Appl. No. 12/617,879, filed Nov. 13, 2009.

Takeuchi et al.; "Multilayer Electronic Component and Method for Manufacturing the Same", U.S. Appl. No. 12/817,352, filed Jun. 17, 2010.

Saruban et al.; "Laminated Ceramic Electronic Component and Manufactruing Method Therefor"; U.S. Appl. No. 12/821,305, filed Jun. 23, 2010.

Motoki et al.; "Laminated Ceramic Electronic Component and Manufacturing Method Therefor"; U.S. Appl. No. 13/050,977, filed Mar. 18, 2011.

Takeuchi et al.; "Multilayer Ceramic Electronic Component and Manufacturing Method Thereof"; U.S. Appl. No. 13/433,320, filed Mar. 29, 2012.

Motoki et al.; "Multilayer Electronic Component and Method for Manufacturing the Same"; U.S. Appl. No. 13/439,916, filed Apr. 5, 2012.

Official Communication issued in corresponding Japanese Patent Application No. 2013-013810, mailed on Jun. 28, 2016.

\* cited by examiner

MONOLITHIC CERAMIC ELECTRONIC COMPONENT

BACKGROUND OF THE INVENTION

1. Field of the Invention

The present invention relates to monolithic ceramic electronic components and particularly relates to a monolithic ceramic electronic component including inner electrodes containing Ni and outer electrodes which are electrically connected to the inner electrodes and which are formed by plating.

2. Description of the Related Art

Outer electrodes of a monolithic ceramic capacitor, which is an example of a monolithic ceramic electronic component, are usually formed in such a way that a conductive paste is applied to end portions of a component body and is then baked. However, the thickness of the outer electrodes, which are formed in the above way, is large, about tens to hundreds of micrometers. Therefore, in order to adjust the size of the monolithic ceramic capacitor to a certain standard size, the effective volume for ensuring the electrostatic capacity needs to be undesirably reduced because the volume of the outer electrodes needs to be ensured.

In order to solve this problem, it has been proposed and has been in practical use that metal coatings are deposited directly on a component body so as to connect lead ends of inner electrodes to each other and each of the metal coatings is used as at least one portion of a corresponding one of the outer electrodes. For example, Japanese Unexamined Patent Application Publication No. 63-169014 discloses a method for forming outer electrodes in such a way that conductive metal layers are deposited by electroless Ni plating over side surfaces of a component body that have exposed inner electrodes such that the inner electrodes exposed on the side surfaces are shorted. According to the outer electrode-forming method, the volume of the outer electrodes can be reduced and therefore the effective volume for ensuring the electrostatic capacity can be increased.

However, a metal coating formed directly on a certain surface of a body of a component has a problem that the anchoring force between the metal coating and the component body is low because there is no glass or the like therebetween, unlike the electrodes formed by baking the conductive paste as described above. When the anchoring force therebetween is low, the interface between the metal coating and the component body may possibly be cracked and suffer from the ingress of moisture. Furthermore, the ingress of moisture into interfaces between ceramic layers and inner electrodes may possibly cause electrical shorts between the inner electrodes, which have different potentials, which impairs functions of the component.

SUMMARY OF THE INVENTION

Preferred embodiments of the present invention provide a monolithic ceramic electronic component capable of solving the above problem.

According to a preferred embodiment of the present invention, a monolithic ceramic electronic component includes a component body and outer electrodes. The component body includes a plurality of stacked ceramic layers and a plurality of inner electrodes which extend between the ceramic layers, which contain Ni, and which have exposed ends exposed on predetermined surfaces of the component body. The outer electrodes are plated electrodes, i.e., the outer electrodes are formed on the predetermined surfaces of the component body by plating, and are electrically connected to the exposed ends of the inner electrodes. The inner electrodes include regions (hereinafter referred to as "Mg—Ni coexistence regions") where Mg and Ni coexist.

The Mg—Ni coexistence regions contain an Mg—Ni oxide. The ceramic layers are made of a ceramic which is an oxide. Therefore, the inner electrodes, which include the Mg—Ni coexistence regions, exert stronger anchoring forces on the ceramic layers as compared to regions containing no Mg—Ni oxide. This allows the interfacial delamination between the ceramic layers and the inner electrodes to be unlikely to occur.

Each of the Mg—Ni coexistence regions is preferably present in at least a corresponding one of portions of the inner electrodes that are located in a peripheral section of a region containing the exposed ends. This allows the anchoring forces between the inner electrodes and the outer electrodes to be reliably increased and therefore allows the ingress of moisture through the interfaces between the component body and the outer electrodes to be reliably prevented.

The Mg—Ni coexistence regions present in the portions of the inner electrodes that are located in the peripheral section of the region containing the exposed ends preferably have an Mg-to-Ni molar ratio of about 0.1 or greater and also preferably have an area fraction of about 25% or greater and more preferably about 70% or greater, for example. An increase in area fraction enables the anchoring forces between the inner electrodes and the outer electrodes to be increased.

The Mg—Ni coexistence regions are preferably present in at least the inner electrodes that are at an outermost location when a region containing the inner electrodes is viewed in a stacking direction in which the ceramic layers are stacked. This allows the delamination of the ceramic layers located in outer portions of the component body to be significantly reduced or prevented.

The Mg—Ni coexistence regions present in the inner electrodes that are at an outermost location when the region containing the inner electrodes is viewed in the stacking direction preferably have an Mg-to-Ni molar ratio of about 0.1 or greater and an area fraction of about 30% or greater, for example. This allows the effect of reducing or preventing the delamination of the ceramic layers located in outer portions of the component body to be reliably exhibited.

According to preferred embodiments of the present invention, inner electrodes including Mg—Ni coexistence regions exert strong anchoring forces to ceramic layers. Therefore, the ingress of moisture into a component body is significantly reduced or prevented. Thus, the moisture resistance reliability of a monolithic ceramic electronic component is increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A monolithic ceramic electronic component 1 according to a first preferred embodiment of the present invention will now be described with reference to FIGS. 1 to 3. The monolithic ceramic electronic component 1 corresponds to a monolithic ceramic capacitor in this non-limiting example. The monolithic ceramic electronic component 1 includes a component body 5 including stacked ceramic layers 2, first inner electrodes 3, and second inner electrodes 4. The first and second inner electrodes 3 and 4 extend between the ceramic layers 2 and contain Ni.

The component body 5 includes two principal surfaces 6 and 7 facing each other and two side surfaces 8 and 9 facing each other, also includes a first end surface 10 and second end surface 11 facing each other, and preferably is cuboid or substantially cuboid in shape, for example. Principal surfaces of each ceramic layer 2 are parallel or substantially parallel to the principal surfaces 6 and 7 of the component body 5.

The first inner electrodes 3 each include an exposed end 12 exposed on the first end surface 10 of the component body 5. The second inner electrodes 4 each include an exposed end 13 exposed on the second end surface 11 of the component body 5. The first inner electrodes 3 and the second inner electrodes 4 are alternately arranged in a stacking direction in which the ceramic layers 2 are stacked.

The first end surface 10 of the component body 5 is overlaid with a first outer electrode 14 electrically connected to the first inner electrodes 3. The second end surface 11 of the component body 5 is overlaid with a second outer electrode 15 electrically connected to the first outer electrode 14. The first and second outer electrodes 14 and 15 each extend to a corresponding one of portions of the first and second end surfaces 10 and 11 and side surfaces 8 and 9, the portions being in contact with the first or second end surface 10 or 11.

The first and second outer electrodes 14 and 15 are preferably formed directly on the component body 5 by plating and thus are plated electrodes. A plating process used herein may be an electroplating process or an electroless plating process, for example. The first and second outer electrodes 14 and 15 each preferably include a metal coating having a two-layer structure including an Ni plating layer and an Sn plating layer disposed thereon. The Ni plating layer may be replaced with a Cu plating layer. The first and second outer electrodes 14 and 15 may each include a single-layer metal coating or a metal coating including three or more layers.

In various preferred embodiments of the present invention, the monolithic ceramic electronic component 1 is constructed such that the first and second inner electrodes 3 and 4 preferably include Mg—Ni coexistence regions 16 where Mg and Ni coexist. Referring to FIGS. 2 and 3, portions of the second inner electrodes 4 are each surrounded by a broken line. The portions surrounded by the broken lines correspond to the Mg—Ni coexistence regions 16.

The Mg—Ni coexistence regions 16 contain an Mg—Ni oxide. Therefore, the first and second inner electrodes 3 and 4, which include the Mg—Ni coexistence regions 16, exert strong anchoring forces on the ceramic layers 2. This allows the interfacial delamination between the ceramic layers 2 and the first and second inner electrodes 3 and 4 to be unlikely to occur. As a result, the ingress of moisture into the component body 5 is significantly reduced or prevented, and therefore the moisture resistance reliability of the monolithic ceramic electronic component 1 is significantly increased.

Figure 2:
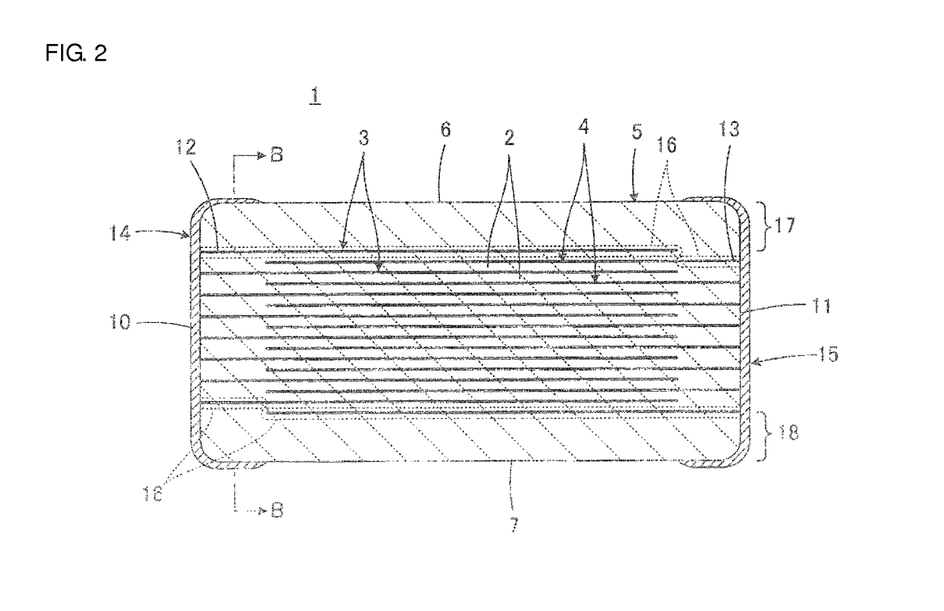
FIG. 2 is a sectional view taken along the line I-I of FIG. 1.

As shown in FIG. 2, the Mg—Ni coexistence regions 16 are preferably present in at least the first and second inner electrodes 3 and 4 that are at an outermost location when a region containing the first and second inner electrodes 3 and 4 is viewed in the stacking direction. In particular, the Mg—Ni coexistence regions 16 are present in the whole outermost first inner electrode 3, the whole outermost second inner electrode 4, a lead portion of the second outermost first inner electrode 3 that extends to the exposed end 12 thereof, and a lead portion of the second outermost second inner electrode 4 that extends to the exposed end 13 thereof. This allows the delamination of the ceramic layers 2 located in outer portions of the component body 5 to be significantly reduced or prevented.

The Mg—Ni coexistence regions 16 present in the first and second inner electrodes 3 and 4 that are at an outermost location when the region containing the first and second inner electrodes 3 and 4 is viewed in the stacking direction as described above preferably have an Mg-to-Ni molar ratio of about 0.1 or greater and an area fraction of about 30% or greater, for example, as is clear from examples below.

Figure 3:
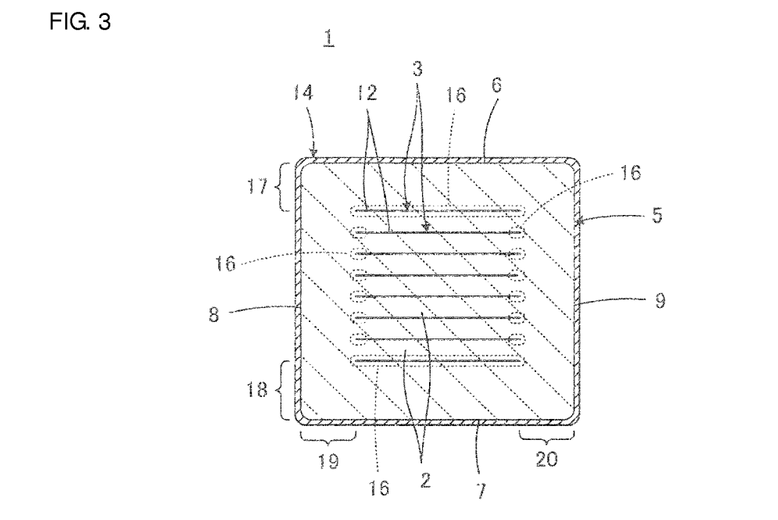
FIG. 3 is a sectional view taken along the line II-II of FIG. 2.

As shown in FIG. 3, which illustrates the first inner electrodes 3, each of the Mg—Ni coexistence regions 16 is preferably present in at least a corresponding one of portions of the first and second inner electrodes 3 and 4 that are located in a peripheral section of a region containing the exposed ends 12 and 13. In particular, the Mg—Ni coexistence regions 16 are present in the whole exposed end 12 of the outermost first inner electrode 3, the whole exposed end 13 of the outermost second inner electrodes 4, both lateral end portions of the exposed ends 12 of the first inner electrodes 3 except the outermost one, and both lateral end portions of the exposed ends 13 of the second inner electrodes 4 except the outermost one. This allows the anchoring forces between the first and second inner electrodes 3 and 4 and the first and second outer electrodes 14 and 15 to be reliably increased and also allows the ingress of moisture through interfaces between the component body 5 and the first and second outer electrodes 14 and 15 to be reliably prevented.

The Mg—Ni coexistence regions 16 present in the portions of the first and second inner electrodes 3 and 4 that are located in the peripheral section of the region containing the exposed ends 12 and 13 as described above preferably have an Mg-to-Ni molar ratio of about 0.1 or greater and also preferably have an area fraction of about 25% or greater and more preferably about 70% or greater, for example, as is clear from examples below.

A non-limiting example of a method for manufacturing the monolithic ceramic electronic component 1 is described below. The description of the manufacturing method reveals a process for producing the Mg—Ni coexistence regions 16, which are one of the unique features of various preferred embodiments of the present invention.

In order to obtain the component body 5, green ceramic sheets to be formed into the ceramic layers 2 are prepared. The green ceramic sheets contain a ceramic material. The ceramic material contains Mg in the form of MgO. The content of Mg in the ceramic material is, for example, about 0.05 mole percent to 2.0 mole percent.

Conductive paste films to be formed into the first and second inner electrodes 3 and 4 are formed on some of the green ceramic sheets by printing or the like. The conductive paste films contain Ni, which is a conductive component.

The green ceramic sheets provided with the conductive paste films are stacked such that the first and second inner electrodes 3 and 4 are alternately arranged. An appropriate number of the green ceramic sheets free from the conductive paste films are deposited on the outermost green ceramic sheets provided with the conductive paste films so as to form outside portions 17 and 18, such that the green component body 5 is obtained.

Incidentally, green component bodies substantially identical to the component body 5 may be obtained in such a way that green ceramic mother sheets capable of providing monolithic ceramic electronic components substantially identical to the monolithic ceramic electronic component 1 are stacked as described above and are then cut.

The green component body 5 is calcined, such that the sintered component body 5 is obtained. The component body 5 includes the ceramic layers 2, which are obtained by sintering the green ceramic sheets, and the first and second inner electrodes 3 and 4, which are obtained by sintering the conductive paste films.

In the above calcination step, the following atmosphere is used: an atmosphere in which Ni contained in the conductive paste films, which are used to form the first and second inner electrodes 3 and 4, is oxidized more or less in the course of heating prior to sintering the green ceramic sheets. Since Mg contained in the green ceramic sheets is likely to diffuse in nickel oxide, the Mg—Ni coexistence regions 16 are readily formed after the sintering of the green ceramic sheets in such a way that the oxidation of Ni contained in the conductive paste films, which are to be formed into the first and second inner electrodes 3 and 4, is allowed to proceed. The amount of Mg in the Mg—Ni coexistence regions 16 can be controlled by controlling the progress of the oxidation of Ni contained in the conductive paste films. The surface of the component body 5 is brought into direct contact with a calcination atmosphere and therefore the oxidation of Ni is likely to proceed particularly in the exposed ends 12 and 13 of the first and second inner electrodes 3 and 4.

In order to produce the Mg—Ni coexistence regions 16, Mg is supplied from the ceramic layers 2 to the first and second inner electrodes 3 and 4. The supply of Mg from the ceramic layers 2 depends on the content of Mg in the green ceramic sheets and, however, is hardly expected because the thickness of the ceramic layers 2, which are located between the first and second inner electrodes 3 and 4, is small, for example, about several micrometers or less, and therefore the absolute amount of Mg in the ceramic layers 2 is small. On the other hand, portions of the component body 5 that are free from the first and second inner electrodes 3 and 4, that is, the outside portions 17 and 18 shown in FIGS. 2 and 3 and side margin portions 19 and 20 shown in FIG. 3 have a volume significantly larger than the volume of the first and second inner electrodes 3 and 4 in contact with these portions. Accordingly, a sufficient amount of Mg can be supplied from the outside portions 17 and 18 and the side margin portions 19 and 20 to the first and second inner electrodes 3 and 4 in contact with these portions.

From the above, the Mg—Ni coexistence regions 16 are formed in the whole outermost first inner electrode 3, the whole outermost second inner electrode 4, the lead portion of the second outermost first inner electrode 3 that extends to the exposed end 12 (refer to FIG. 2), and the lead portion of the second outermost second inner electrode 4 that extends to the exposed end 13 (refer to FIG. 2), the whole exposed end 12 of the second outermost first inner electrode 3, the whole exposed end 13 of the second outermost second inner electrode 4, the lateral end portions of the exposed ends 12 of the first inner electrodes 3 except the outermost one (refer to FIG. 3), and the lateral end portions of the exposed ends 13 of the second inner electrodes 4 except the outermost one (refer to FIG. 3) when viewed in the stacking direction. Furthermore, in portions except the exposed ends 12 and 13 of the first and second inner electrodes 3 and 4, the Mg—Ni coexistence regions 16 are formed in the whole exposed end 12 of the outermost first inner electrode 3, the whole exposed end 13 of the outermost second inner electrode 4, and lateral end portions of the first and second inner electrodes 3 and 4 except the outermost ones when viewed in the stacking direction. This is not shown in FIG. 3.

The component body 5 is barrel-polished as required, such that the exposed ends 12 and 13 of the first and second inner electrodes 3 and 4 are reliably exposed. The component body 5 is preferably cleaned with pure water.

The first and second outer electrodes 14 and 15 are formed on the component body 5 by plating. The plating process used may be the electroplating process or the electroless plating process as described above. The Mg—Ni coexistence regions 16 in the first and second inner electrodes 3 and 4 exert strong anchoring forces on the ceramic layers 2 and therefore reduce or prevent the ingress of a plating solution into the component body 5 along interfaces between the ceramic layers 2 and the first and second inner electrodes 3 and 4. Even if the plating solution enters the component body 5, the Mg—Ni coexistence regions 16 still reduce or prevent the delamination of the ceramic layers 2.

The monolithic ceramic electronic component 1 preferably is completed in the above way.

Figure 1:
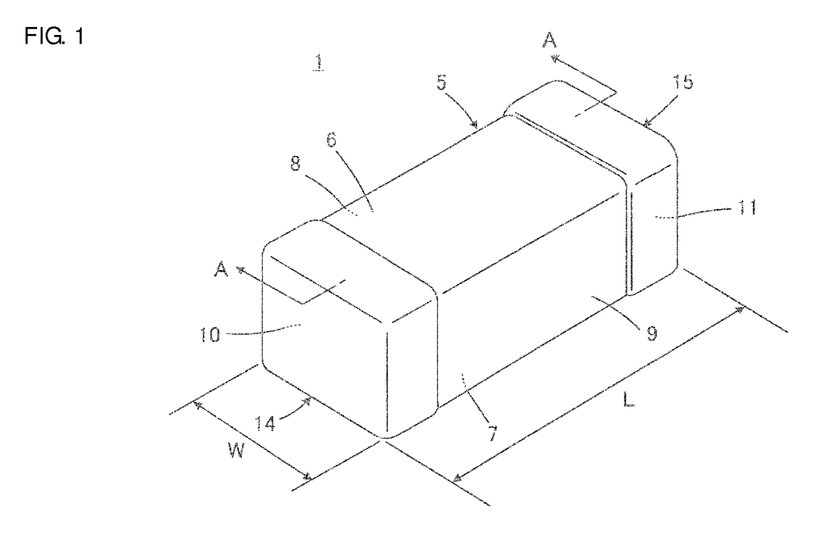
FIG. 1 is a perspective view of a monolithic ceramic electronic component according to a first preferred embodiment of the present invention.
Figure 4:
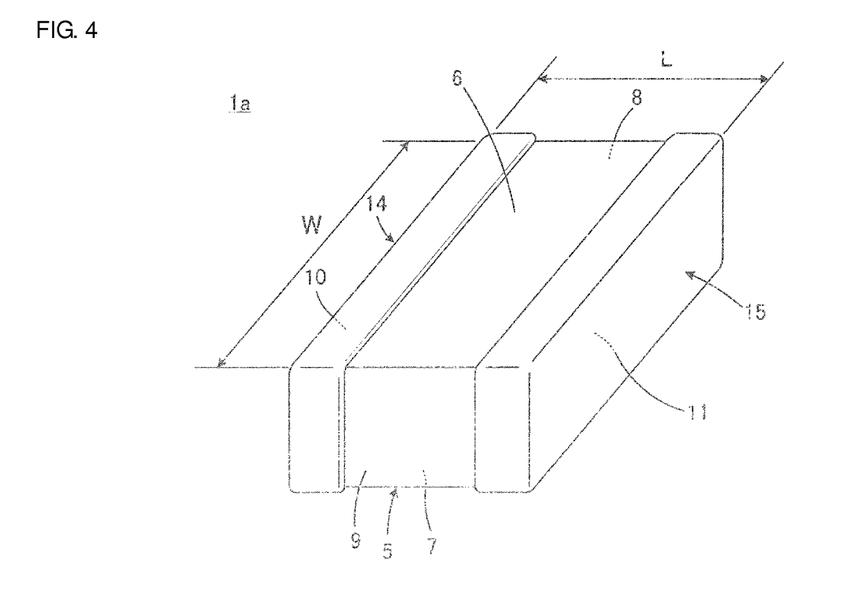
FIG. 4 is a perspective view of a monolithic ceramic electronic component according to a second preferred embodiment of the present invention.

As shown in FIG. 1, the monolithic ceramic electronic component 1 satisfies the inequality L>W, where L represents the length of the monolithic ceramic electronic component 1 that is defined as a size in the direction connecting the first and second outer electrodes 14 and 15 and W is the width of the monolithic ceramic electronic component 1 that is defined as a size in a direction perpendicular to the direction connecting the first and second outer electrodes 14 and 15. Preferred embodiments of the present invention can be applied to a monolithic ceramic electronic component 1a shown in FIG. 4. The monolithic ceramic electronic component 1a is a so-called L-W reverse type of monolithic ceramic electronic component that satisfies the inequality L<W. In FIG. 4, elements corresponding to elements shown in FIG. 1 are denoted by substantially the same reference numerals as those of the elements shown in FIG. 1 and will not be described in detail.

In the above monolithic ceramic electronic components 1 and 1a, the ceramic layers 2 are preferably made of a dielectric ceramic. A monolithic ceramic electronic component according to the present invention is not limited to a monolithic ceramic capacitor and may be, for example, an inductor, a thermistor, a piezoelectric component, or the like. Therefore, the ceramic layers 2 may be made of a magnetic ceramic, a semiconductor ceramic, a piezoelectric ceramic, or the like in addition to the dielectric ceramic depending on functions of the monolithic ceramic electronic components 1 and 1a.

The monolithic ceramic electronic components 1 and 1a each preferably include the two first and second outer electrodes 14 and 15 and are a two-terminal type, for example. The present invention can be applied to a multiterminal type of monolithic ceramic electronic component including three or more terminals.

EXAMPLES

Non-limiting examples performed in order to confirm the effects of various preferred embodiments of the present invention are described below.

Example 1

In Example 1, attention was focused particularly on the Mg—Ni coexistence regions 16 present in the portions of the first and second inner electrodes 3 and 4 that are located in the peripheral section of the region containing the exposed ends 12 and 13 as shown in FIG. 3. Effects of this Mg—Ni coexistence region 16 were investigated.

Monolithic ceramic electronic components were prepared as samples.

A component body included in each monolithic ceramic electronic component was obtained as described below. Green ceramic sheets to be formed into ceramic layers and conductive paste films, to be formed into inner electrodes, containing Ni were stacked, such that the green component body was prepared. The green ceramic sheets contained a barium titanate-based dielectric ceramic material containing Mg.

The green component body was calcined. In the calcination step, the progress of the oxidation of Ni in the conductive paste films was varied in such a way that an oxidizing atmosphere was controlled in the course of heating before the green ceramic sheets were sintered, such that the amount of Mg diffusing in the inner electrodes was varied and the sintered component body was obtained. The amount of Mg in the inner electrodes was determined by an analysis below. The analysis results are shown in the column "Region, present in peripheral section, having Mg-to-Ni molar ratio of about 0.1 or greater" of Table 1 in the form of an area fraction. Such a region having Mg-to-Ni molar ratio of about 0.1 or greater should be understood such that the region is obtained as a result of varying the oxidizing atmosphere in the course of heating before the green ceramic sheets are sintered.

For pretreatment for plating, the component body was barrel-polished such that exposed ends of the inner electrodes were reliably exposed. The component body was then cleaned with pure water.

The component body was subjected to Ni electroplating and then Sn electroplating, such that outer electrodes were formed on the component body so as to each include an Ni plating layer and an Sn plating layer placed thereon.

The monolithic ceramic electronic component obtained as described above had a planar size of about 1.0 mm×0.5 mm including the component body and the outer electrodes and was an L-W reverse type. In the component body, the ceramic layers between the inner electrodes had a thickness of about 1 μm, the inner electrodes had a thickness of about 1 μm, and outside portions provided with no inner electrodes had a thickness of about 50 μm.

The monolithic ceramic electronic components were obtained as described above. The monolithic ceramic electronic components correspond to samples shown in Table 1.

After a cross section of each monolithic ceramic electronic component was exposed by polishing, portions of the inner electrodes that were located in a peripheral section of a region containing the exposed ends were analyzed by wavelength-dispersive X-ray spectroscopy (WDX), such that Mg atoms and Ni atoms only were detected and the distribution of the Mg and Ni atoms was measured. From the obtained results, the variation of the Mg-to-Ni molar ratio was determined. In the portion located in the peripheral section, the area fraction (%) of a region having an Mg-to-Ni molar ratio of about 0.1 or greater was determined. The average of the area fractions of three specimens is shown in the column "Region, present in peripheral section, having Mg-to-Ni molar ratio of about 0.1 or greater" of Table 1, the average being rounded to the nearest integer.

The anchoring force of the outer electrodes was determined. In particular, after the monolithic ceramic electronic component was soldered to a substrate, the monolithic ceramic electronic component was subjected to a shear strength test in such a way that the monolithic ceramic electronic component was pushed parallel or substantially parallel to the substrate, such that the maximum stress at which the outer electrodes were peeled off was measured. The average of the maximum stresses of ten specimens was determined. The obtained results are shown in the column "Anchoring force" of Table 1.

The monolithic ceramic electronic component was subjected to a humidity load test. In particular, the monolithic ceramic electronic component was tested for about 144 hours under the following conditions: a temperature of about 85° C., a relative humidity of about 85%, and an applied voltage of about 4 V. A sample having an insulation resistance IR of less than about $1 \times 10^7 \Omega$ was judged to be faulty. The number of failures per 72 specimens was determined. The obtained results are shown in the column "Number of failures in humidity load" of Table 1.

TABLE 1

| Samples | Region, present in peripheral section, having Mg-to-Ni molar ratio of about 0.1 or greater (%) | Anchoring force | Number of failures in humidity load |
| --- | --- | --- | --- |
| 1 | 0 | 15 N | 30/72 |
| 2 | 12 | 16 N | 11/72 |
| 3 | 25 | 18 N | 5/72 |
| 4 | 52 | 20 N | 2/72 |
| 5 | 70 | 22 N | 0/72 |
| 6 | 87 | 25 N | 0/72 |

From Table 1, it is clear that when Mg—Ni coexistence regions are present in portions of inner electrodes that are located in a peripheral section of a region containing exposed ends of the inner electrodes, outer electrodes have increased anchoring forces and the moisture resistance reliability is high.

Furthermore, it is clear that the outer electrodes of Samples 3 to 6, which have regions having an Mg-to-Ni molar ratio of about 0.1 or greater and an area fraction of about 25% or greater, have an anchoring force that is about 1.2 times or greater that of the outer electrodes of Sample 1, which has no region having an Mg-to-Ni molar ratio of about 0.1 or greater.

Furthermore, it is clear that Samples 5 and 6, which have regions having an Mg-to-Ni molar ratio of about 0.1 or greater and an area fraction of about 70% or greater, have improved moisture resistance reliability.

Example 2

In Example 2, attention was focused particularly on the Mg—Ni coexistence regions 16 present in the first and second inner electrodes 3 and 4 that are at an outermost location as shown in FIG. 2 when the region containing the first and second inner electrodes 3 and 4 is viewed in the stacking direction. Effects of these Mg—Ni coexistence regions 16 were investigated.

Monolithic ceramic electronic components which were not an L-W reverse type and which were different from those prepared in Example 1 were prepared as samples.

Green component bodies having a composition substantially identical to that of the component bodies used in Example 1 were prepared. Each green component body was calcined. In the calcination step, an oxidizing atmosphere was controlled in the course of heating before green ceramic sheets were sintered, such that the amount of Mg diffusing in inner electrodes was varied and the sintered component body was obtained. The amount of Mg in the inner electrodes was determined by an analysis below similarly to Example 1. The analysis results are shown in the column "Region, present in outermost layer, having Mg-to-Ni molar ratio of about 0.1 or greater" of Table 2 in the form of an area fraction.

For pretreatment for plating, the component body was barrel-polished such that exposed ends of the inner electrodes were reliably exposed. The component body was then cleaned with pure water.

The component body was subjected to Ni electroplating and then Sn electroplating, such that outer electrodes were formed on the component body so as to each include an Ni plating layer and an Sn plating layer placed thereon.

The monolithic ceramic electronic component obtained as described above was not an L-W reverse type and had a planar size of about 1.0 mm×0.5 mm including the component body and the outer electrodes. In the component body, the ceramic layers between the inner electrodes had a thickness of about 1 μm, the inner electrodes had a thickness of about 1 μm, and outside portions provided with no inner electrodes had a thickness of about 50 μm.

The monolithic ceramic electronic components were obtained as described above. The monolithic ceramic electronic components correspond to samples shown in Table 2.

After a cross section of each monolithic ceramic electronic component was exposed by polishing, the inner electrodes that were at an outermost location when a region containing the inner electrodes was viewed in the stacking direction were analyzed by wavelength-dispersive X-ray spectroscopy (WDX), such that Mg atoms and Ni atoms only were detected and the distribution of the Mg and Ni atoms was measured. From the obtained results, the variation of the Mg-to-Ni molar ratio was determined. In the outermost inner electrodes, the area fraction (%) of a region having an Mg-to-Ni molar ratio of about 0.1 was determined. The average of the area fractions of three specimens is shown in the column "Region, present in outermost layer, having Mg-to-Ni molar ratio of about 0.1 or greater" of Table 2, the average being rounded to the nearest integer.

The outer electrodes were evaluated for delamination. In particular, each monolithic ceramic electronic component was subjected to a nondestructive internal defect inspection in such a way that ultrasonic waves were applied to the monolithic ceramic electronic component using water as a medium. The number of defective specimens per 100 specimens was determined. The obtained results are shown in the column "Rate of occurrence of delamination" of Table 2.

TABLE 2

| Samples | Region, present in outermost layer, having Mg-to-Ni molar ratio of about 0.1 or greater (%) | Rate of occurrence of delamination |
| --- | --- | --- |
| 11 | 0 | 52/100 |
| 12 | 9 | 10/100 |
| 13 | 30 | 0/100 |
| 14 | 45 | 0/100 |
| 15 | 82 | 0/100 |

From Table 2, it is clear that the presence of an Mg—Ni coexistence region having an Mg-to-Ni molar ratio of about 0.1 or greater in each outermost inner electrode reduces the rate of occurrence of delamination.

Furthermore, it is clear that delamination does not occur at all in Samples 13 to 15, which have regions having an Mg-to-Ni molar ratio of about 0.1 or greater and an area fraction of about 30% or greater, and this is effective.

Example 3

In Example 3, as well as Example 2, attention was focused particularly on the Mg—Ni coexistence regions 16 present in the first and second inner electrodes 3 and 4 that are at an outermost location as shown in FIG. 2 when the region containing the first and second inner electrodes 3 and 4 is viewed in the stacking direction. Effects of these Mg—Ni coexistence regions 16 were investigated.

Monolithic ceramic electronic components were prepared as samples in substantially the same way as that described in Example 2 except that outer electrodes were formed on each component body in such a way that the component body was subjected to Cu electroplating, Ni electroplating, and then Sn electroplating.

As shown in Table 3, each region, present in outermost layer, having an Mg-to-Ni molar ratio of about 0.1 or greater and the rate of occurrence of delamination were determined in substantially the same ways as those described in Example 2.

TABLE 3

| Samples | Region, present in outermost layer, having Mg-to-Ni molar ratio of about 0.1 or greater (%) | Rate of occurrence of delamination |
| --- | --- | --- |
| 21 | 0 | 49/100 |
| 22 | 9 | 9/100 |
| 23 | 30 | 0/100 |
| 24 | 45 | 0/100 |
| 25 | 82 | 0/100 |

In Example 3, results similar to those obtained in Example 2 were obtained.

That is, from Table 3, it is clear that the presence of an Mg—Ni coexistence region having an Mg-to-Ni molar ratio of about 0.1 or greater in each outermost inner electrode reduces the rate of occurrence of delamination.

Furthermore, it is clear that delamination does not occur at all in Samples 23 to 25, which have regions having an Mg-to-Ni molar ratio of about 0.1 or greater and an area fraction of about 30% or greater, and this is effective.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic electronic component comprising:
   a component body including:
      a plurality of ceramic layers stacked in a stacking direction; and
      a plurality of inner electrodes each of which is located between a pair of the ceramic layers, contain Ni, and includes exposed ends exposed at predetermined surfaces of the component body; and
   outer electrodes located on the predetermined surfaces of the component body, the outer electrodes being plated electrodes directly formed on the predetermined surfaces of the component body by plating and being electrically connected to the exposed ends of the inner electrodes; wherein
   the inner electrodes include Mg—Ni coexistence regions where Mg and Ni coexist; and
   the Mg—Ni coexistence regions are present in all portions of the exposed ends of inner electrodes of the plurality of inner electrodes that are at outermost locations when a region containing the inner electrodes is viewed in the stacking direction.

2. The monolithic ceramic electronic component according to claim 1, wherein each of the Mg—Ni coexistence regions is present in at least a corresponding one of portions of the inner electrodes that are located in a peripheral section of a region containing the exposed ends.

3. The monolithic ceramic electronic component according to claim 2, wherein the Mg—Ni coexistence regions present in the portions of the inner electrodes that are located in the peripheral section of the region containing the exposed ends have an Mg-to-Ni molar ratio of about 0.1 or greater and an area fraction of about 25% or greater.

4. The monolithic ceramic electronic component according to claim 2, wherein the Mg—Ni coexistence regions present in the portions of the inner electrodes that are located in the peripheral section of the region containing the exposed ends have an Mg-to-Ni molar ratio of about 0.1 or greater and an area fraction of about 70% or greater.

5. The monolithic ceramic electronic component according to claim 1, wherein the Mg—Ni coexistence regions present in the inner electrodes that are at the outermost locations when the region containing the inner electrodes is viewed in the stacking direction have an Mg-to-Ni molar ratio of about 0.1 or greater and an area fraction of about 30% or greater.

6. The monolithic ceramic electronic component according to claim 1, wherein the Mg—Ni coexistence regions present in the inner electrodes that are at the outermost locations when the region containing the inner electrodes is viewed in the stacking direction have an Mg-to-Ni molar ratio of about 0.1 or greater and an area fraction of about 70% or greater.

7. The monolithic ceramic electronic component according to claim 1, wherein the monolithic ceramic electronic component is a monolithic ceramic capacitor.

8. The monolithic ceramic electronic component according to claim 1, wherein the plated electrodes are formed by electroplating or electroless plating.

9. The monolithic ceramic electronic component according to claim 1, wherein each of the outer electrodes includes a two-layer structure including a Ni plated layer and a Sn plated layer.

10. The monolithic ceramic electronic component according to claim 1, wherein each of the outer electrodes includes a two-layer structure including a Cu plated layer and a Sn plated layer.

11. The monolithic ceramic electronic component according to claim 1, wherein each of the outer electrodes includes one of a single metal layer structure, a two metal layer structure, and a structure including three or more metal layers.

12. The monolithic ceramic electronic component according to claim 1, wherein each of the Mg—Ni coexistence regions includes an Mg—Ni oxide.

13. The monolithic ceramic electronic component according to claim 1, wherein
   the Mg—Ni coexistence regions are present in a whole outermost first inner electrode, a whole outermost second inner electrode, a lead portion of a second outermost first inner electrode, and a lead portion of a second outermost second inner electrode; and
   the outermost first inner electrode and the outermost second inner electrode are included within the inner electrodes that are located at the outermost locations.

14. The monolithic ceramic electronic component according to claim 13, wherein the Mg—Ni coexistence regions have an Mg-to-Ni molar ratio of about 0.1 or greater and an area fraction of about 30% or greater.

15. The monolithic ceramic electronic component according to claim 1, wherein
   the Mg—Ni coexistence regions are present in a whole exposed end of an outermost first inner electrode, a whole exposed end of an outermost second inner electrode, both lateral end portions of exposed ends of a first of the inner electrodes that is not an outermost inner electrode, and both lateral end portions of exposed ends of a second of the inner electrodes that is not an outermost inner electrode; and
   the outermost first inner electrode and the outermost second inner electrode are included within the inner electrodes that are located at the outermost locations.

16. The monolithic ceramic electronic component according to claim 15, wherein the Mg—Ni coexistence regions have an Mg-to-Ni molar ratio of about 0.1 or greater and an area fraction of about 25% or greater.

17. The monolithic ceramic electronic component according to claim 15, wherein the Mg—Ni coexistence regions have an Mg-to-Ni molar ratio of about 0.1 or greater and an area fraction of about 70% or greater.

18. The monolithic ceramic electronic component according to claim 1, wherein the monolithic ceramic electronic component is one of a capacitor, an inductor, a thermistor, and a piezoelectric component.

* * * * *